(12) United States Patent
Soo et al.

(10) Patent No.: US 8,171,173 B2
(45) Date of Patent: May 1, 2012

(54) METHOD AND APPARATUS FOR MANAGING DELIVERY OF MEDIA CONTENT

(75) Inventors: Armstrong Soo, San Ramon, CA (US); Bernard Ku, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 519 days.

(21) Appl. No.: 12/043,783

(22) Filed: Mar. 6, 2008

(65) Prior Publication Data

US 2009/0228607 A1    Sep. 10, 2009

(51) Int. Cl.
*G06F 15/16*   (2006.01)
*G06F 15/173*  (2006.01)
*H04N 7/173*   (2011.01)
*H04N 7/16*    (2011.01)

(52) U.S. Cl. ........ 709/249; 709/224; 709/226; 709/229; 725/106; 725/109; 725/135

(58) Field of Classification Search ................... 709/224, 709/229, 249, 226; 725/109–11, 114, 119, 725/138–139, 131, 149; 370/270, 432, 420, 370/402

See application file for complete search history.

(56) References Cited

U.S. PATENT DOCUMENTS

| | | | |
|---|---|---|---|
| 6,173,322 B1 * | 1/2001 | Hu | 709/224 |
| 2005/0044229 A1 * | 2/2005 | Brown et al. | 709/226 |
| 2006/0224725 A1 * | 10/2006 | Bali et al. | 709/224 |
| 2007/0058043 A1 | 3/2007 | Thukral | |
| 2007/0171828 A1 | 7/2007 | Dalal et al. | |
| 2007/0189243 A1 | 8/2007 | Wang et al. | |
| 2008/0005349 A1 | 1/2008 | Li et al. | |
| 2008/0140849 A1 * | 6/2008 | Collazo | 709/229 |

FOREIGN PATENT DOCUMENTS

WO    0135689    5/2001

* cited by examiner

*Primary Examiner* — Ian N Moore
*Assistant Examiner* — Kiet Tang
(74) *Attorney, Agent, or Firm* — Guntin Meles & Gust, PLC; Andrew Gust

(57) ABSTRACT

A system that incorporates teachings of the present disclosure may include, for example, a set top box having a controller to select a portion of content servers among a plurality of content servers for delivery of media content to the set top box, where the selection is based on server metrics associated with the plurality of content servers and received by the set top box. Other embodiments are disclosed.

22 Claims, 7 Drawing Sheets

200

400

METHOD AND APPARATUS FOR MANAGING DELIVERY OF MEDIA CONTENT

FIELD OF THE DISCLOSURE

The present disclosure relates generally to communication systems and more specifically to a method and apparatus for managing delivery of media content.

BACKGROUND

In order to reliably deliver time-sensitive media content in large scale using Internet Protocol, service providers often over-engineer a network to compensate for delays in network throughput. This can result in wasted resources in procuring the network elements and bandwidth.

Service providers can program the destination of the network element statistically relying on historical data or use load-balancing to distribute the load evenly to all elements in the pool in round-robin fashion. These techniques do not always provide for efficient use of the network elements, particularly where the media content demands are rapidly changing or where a particular cluster of servers is already overloaded. In distributed computing environments, the main distributor can provide jobs to idle servers, but in Internet Protocol Television System applications (e.g., video-on-demand), there may not be any idle servers.

DETAILED DESCRIPTION

One embodiment of the present disclosure entails a computer-readable storage medium in a set top box having computer instructions for requesting media service from a video head office having a plurality of clusters of content servers, polling one or more quality assurance servers for server metrics associated with each of the plurality of clusters where the one or more quality assurance servers compile the server metrics for each of the content servers of the plurality of clusters, receiving the server metrics, and selecting a cluster of content servers for delivery of the media service based at least in part on the server metrics.

Another embodiment of the present disclosure entails a set top box having a controller to select a portion of content servers among a plurality of content servers for delivery of media content to the set top box, where the selection is based on server metrics associated with the plurality of content servers and received by the set top box.

Yet another embodiment of the present disclosure entails a server having a controller to receive a request from a set top box for server metrics associated with content servers coupled to the server, poll each of the content servers for data associated with the server metrics, and provide the server metrics to the set top box, where a selection of a portion of the content servers for delivery of media content is made by the set top box based at least in part on the server metrics.

Yet another embodiment of the present disclosure entails server having a controller to receive a request from a quality assurance server for server metrics including at least one of CPU usage and available memory associated with the server, provide the server metrics to the quality assurance server where the quality assurance server provides the server metrics to a set top box and where a selection of a cluster of content servers for delivery of media content is made by the set top box based at least in part on the server metrics, and provide the media content to the set top box when the server is among the selection of the cluster of content servers.

Yet another embodiment of the present disclosure entails a method including requesting media service from an internet protocol television system having a plurality of clusters of content servers, polling a plurality of quality assurance servers for server metrics associated with each of the plurality of clusters where each of the plurality of quality assurance servers are communicatively coupled to a corresponding one of the plurality of clusters, receiving the server metrics at a set top box, and selecting a cluster of content servers for delivery of the media service to the set top box based at least in part on the server metrics.

Figure 1:
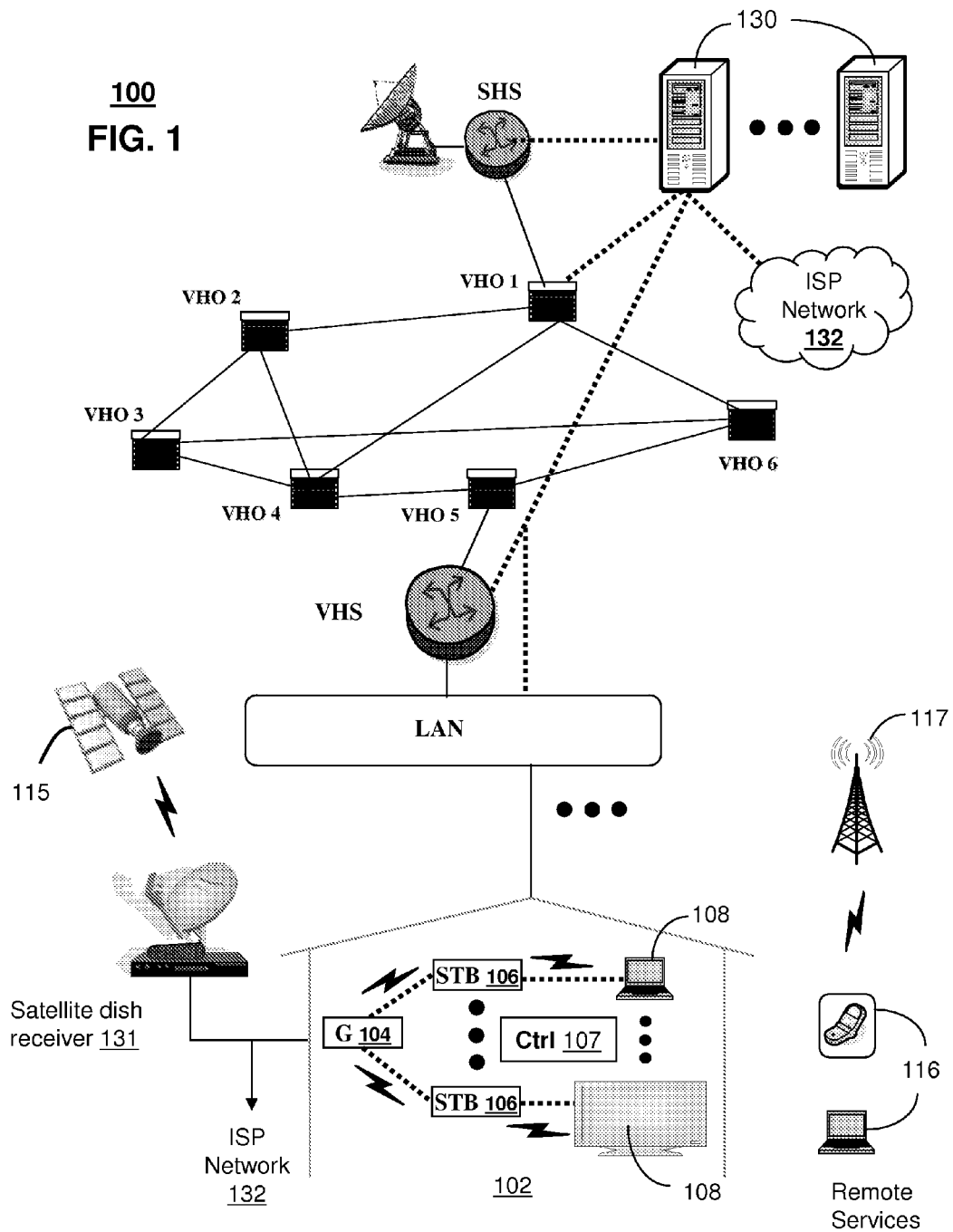
FIGS. 1-3 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server can forward IP packets associated with the media content to video head-end servers (VHS) via a network of aggregation points such as video head-end offices (VHO) according to a common multicast communication method.

The VHS can then distribute multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 can distribute broadcast signals to media processors 106, such as Set-Top Boxes (STBs), which in turn present broadcast selections to media devices 108, such as computers or television devices, managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and/or present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of, or in combination with, the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems, such as cable TV systems.

Figure 2:
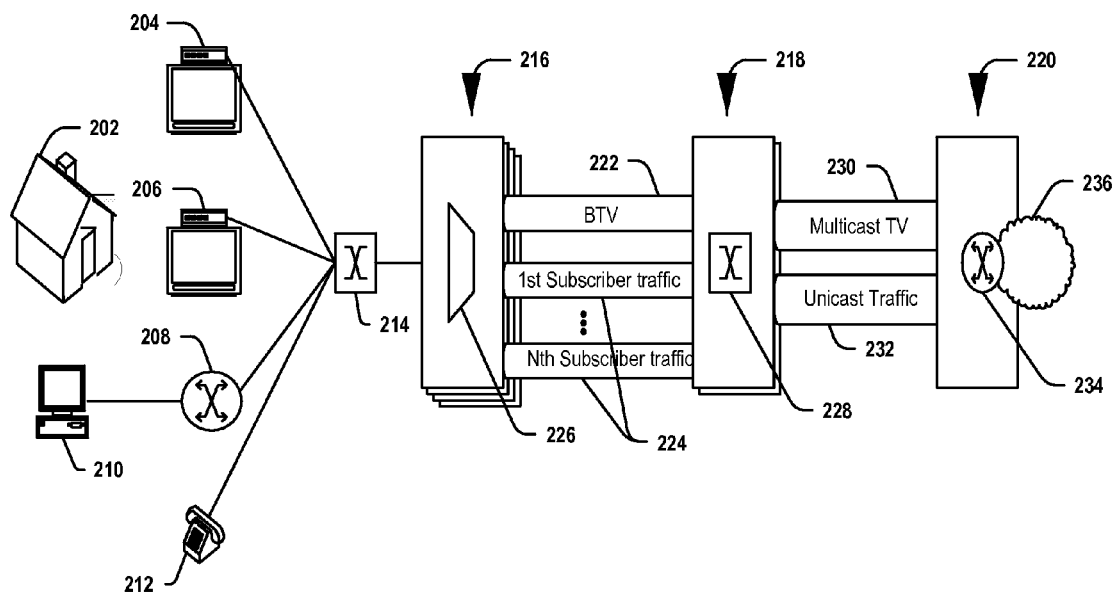

FIG. 2 depicts an exemplary embodiment of a second communication system 200 for delivering media content. Communication system 200 can be overlaid or operably coupled with communication system 100 as another representative embodiment of said communication system. The system 200 can include a distribution switch/router system 228 at a central office 218. The distribution switch/router system 228 can receive video data via a multicast television stream 230 from a second distribution switch/router 234 at an intermediate office 220. The multicast television stream 230 can include Internet Protocol (IP) data packets addressed to a multicast IP address associated with a television channel. The distribution switch/router system 228 can cache data associated with each television channel received from the intermediate office 220.

The distribution switch/router system 228 can also receive unicast data traffic from the intermediate office 220 via a unicast traffic stream 232. The unicast traffic stream 232 can include data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, can receive a channel change command from an input device, such as a remoter control device. The channel change command can indicate selection of an IPTV channel. After receiving the channel change command, the set-top box device 204 can generate channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
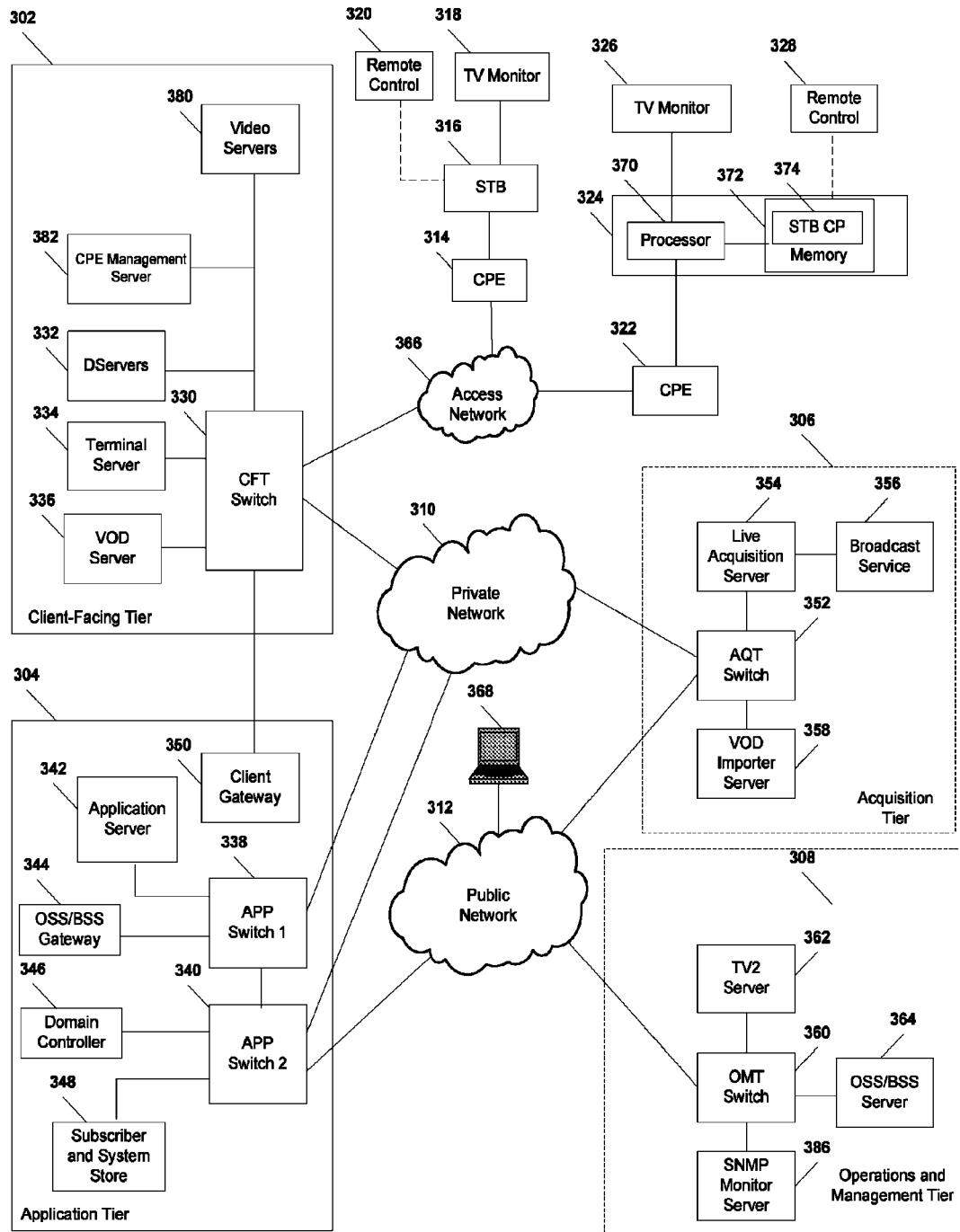

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 can be coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 can communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the VOD importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
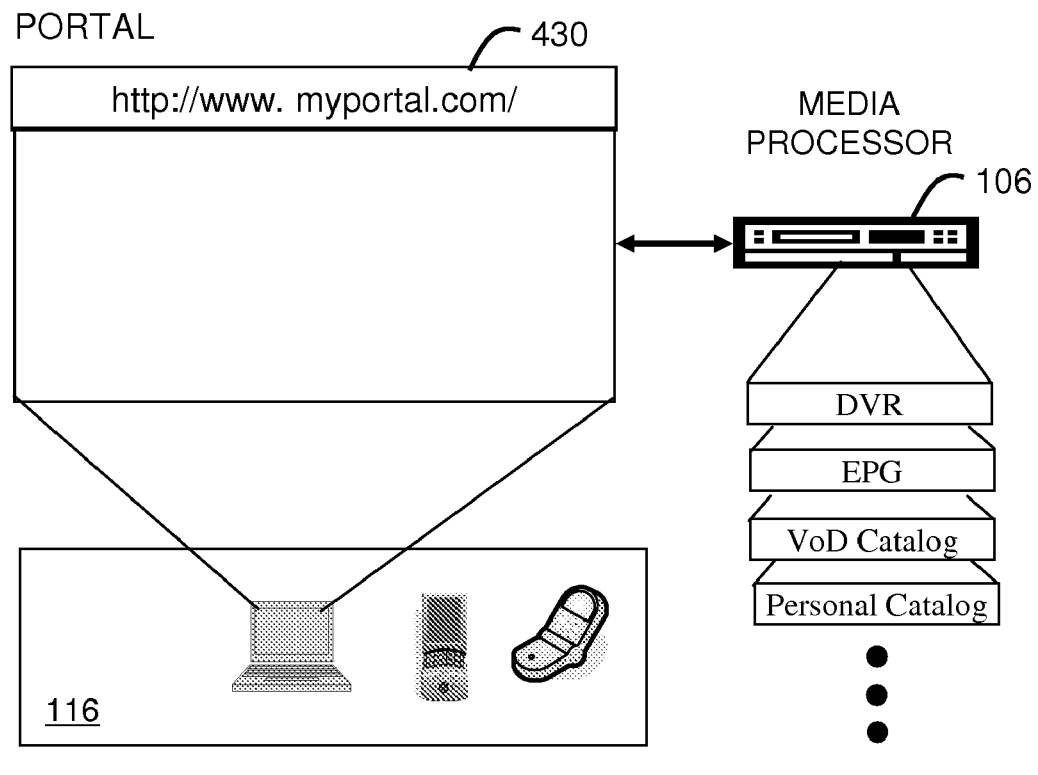
FIG. 4 depicts an exemplary embodiment of a portal interacting with at least one among the communication systems of FIGS. 1-3.

FIG. 4 depicts an exemplary embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 5:
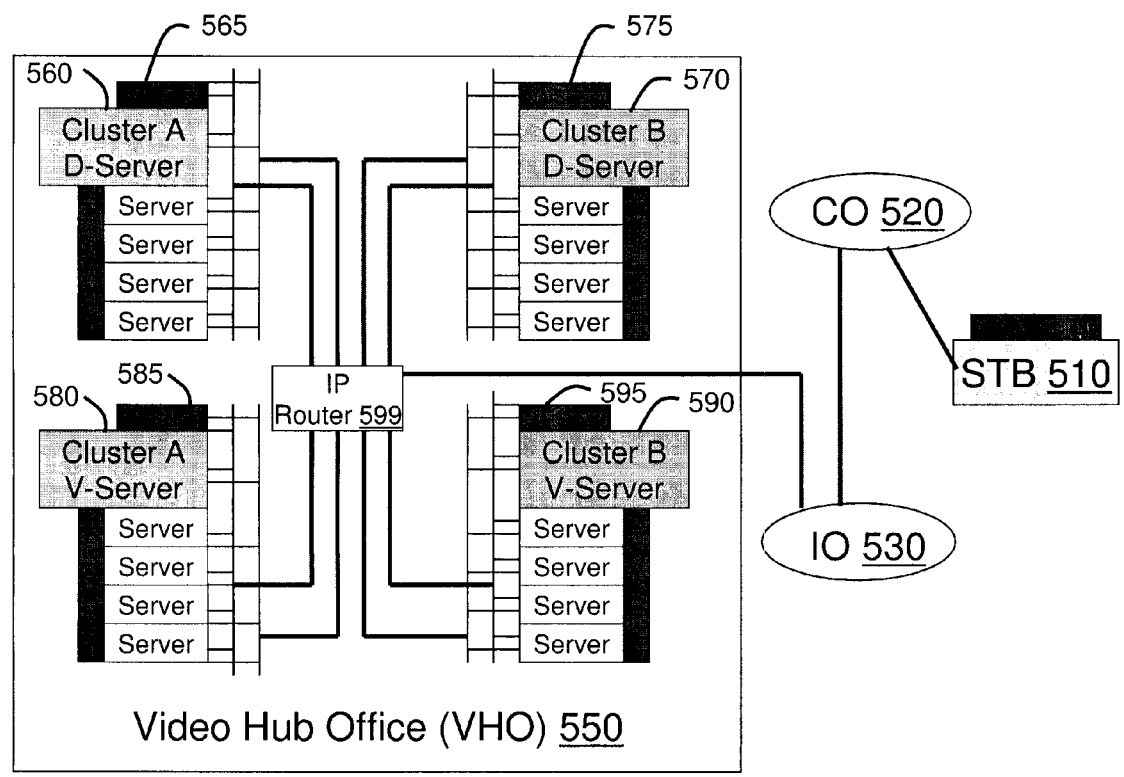
FIG. 5 depicts an exemplary embodiment of a portion of one or more of the communication systems of FIGS. 1-3

FIG. 5 depicts an exemplary embodiment of a portion of an IPTV system with a content delivery system 500 having a VHO 550 that can operate in one or more of communication systems 100, 200 and 300. The VHO 550 can be in communication with other network elements, such as those contained within an intermediate office 530 and/or a central office 520. The particular number and configuration of the VHO 550, the intermediate office 530 and the central office 520 can vary. An STB 510 can be in communication with the central office 520 for receipt of media content from the VHO 550. The STB 510 can include Quality Assurance (QA) client software for content delivery management, as will be described later in greater detail.

The VHO 550 can include one or more D-server clusters 560, 570 having a plurality of content servers, and one or more V-server clusters 580, 590 having a plurality of content servers. In VHO 550, the D-server clusters 560, 570 can be responsible for rapid channel changing, while the V-server clusters 580, 590 can be responsible for delivering VoD content.

Each of the D-server clusters 560, 570 can have a QA server 565, 575 coupled thereto, as well as a QA application client software for content delivery management, as will be described later in greater detail. Each of the V-server clusters 580, 590 can have a QA server 585, 595 coupled thereto, as well as a QA application client software for content delivery management, as will be described later in greater detail. Each of the QA servers can reside in the same network segment as its corresponding content servers. An IP router 599 or other network element(s) can provide for communication between the clusters of content servers and the STB 510.

Figure 6:
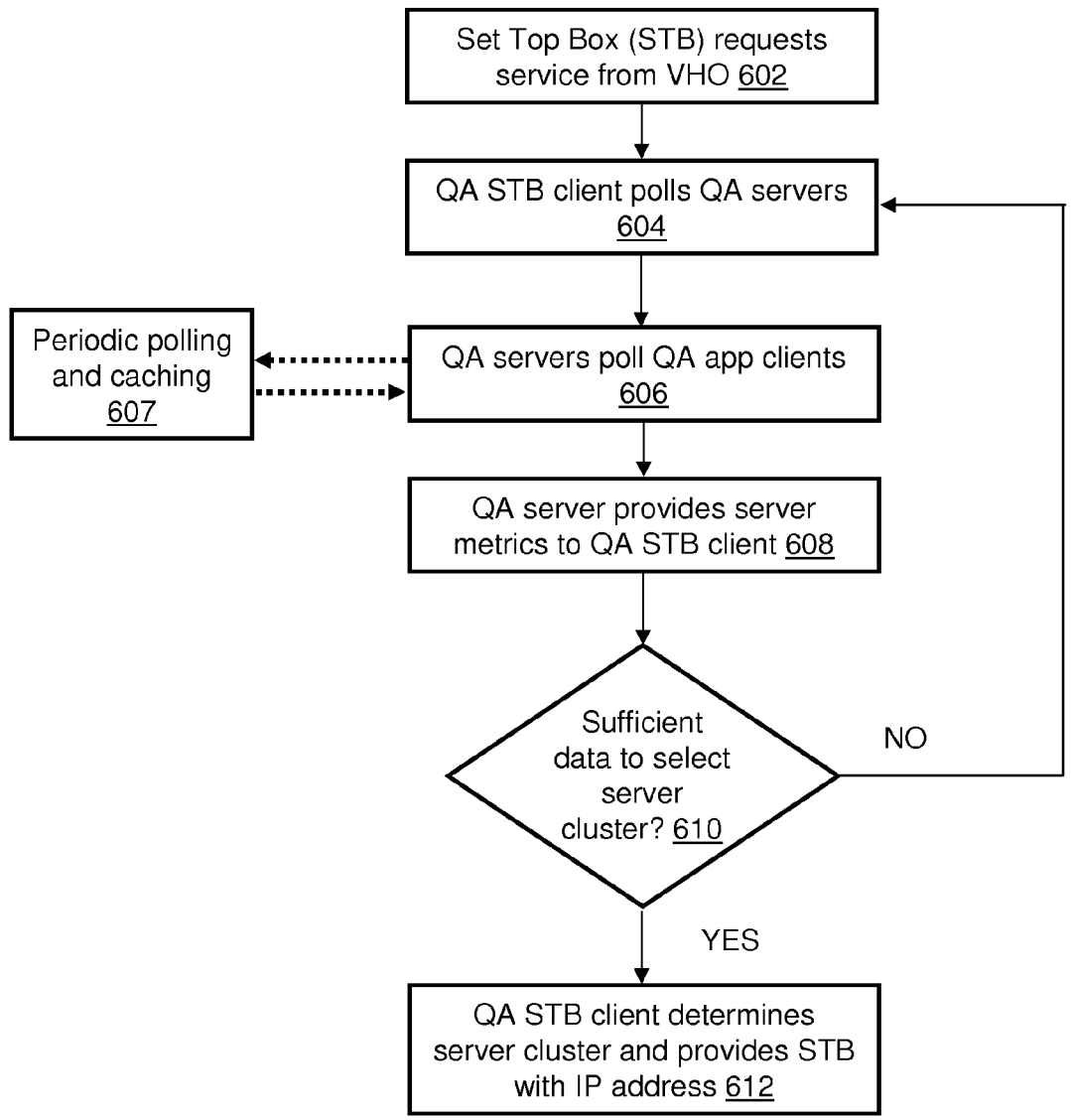
FIG. 6 depicts an exemplary method operating in portions of the communication systems of FIGS. 1-3.

FIG. 6 depicts an exemplary method 600 operating in portions of one or more of the communication systems 100-300 and 500. Method 600 has variants as depicted by the dashed lines. It would be apparent to an artisan with ordinary skill in the art that other embodiments not depicted in FIG. 6 are possible without departing from the scope of the claims described below. For convenience, reference to one or more features of the content delivery system 500 as used in the following paragraphs can mean one or more features of the communication systems 100, 200, and 300 singly or in combination, including STBs 106, 204, 206, 316, 324 and/or 510.

Method 600 can begin with step 602 where the STB 106 requests media service from the IPTV system, such as from the VHO 550. The particular media service can vary and can include media content from regularly scheduled programming and/or video-on-demand. In step 604, the STB 106 can poll QA servers associated with each of the clusters of content servers for server metrics. The polling can be initiated by software resident on the STB 106, such as a QA STB client. In one embodiment, the polling performed by the STB 106 of the QA servers can be on a periodic basis. In another embodiment, the frequency of polling of the QA servers can be adjusted by the STB 106, such as based on heavier traffic time periods where server metrics may change more rapidly.

In step 606, the QA servers can poll each of the content servers of the plurality of clusters for the server metrics or data associated with the server metrics. The particular server metrics obtained can vary. For example, the QA servers can retrieve data corresponding to CPU usage and/or available memory (e.g., RAM) for each of the content servers. In one embodiment in step 607, the QA server can poll the content servers on a periodic basis and store the server metrics, such as through caching the data. In another embodiment, the frequency of polling of the content servers can be adjusted by the STB 106, such as based on heavier traffic time periods where server metrics may change more rapidly. The present disclosure also contemplates the content servers being tasked with a particular computation (e.g., calculating the value of pi), such as by the STB 106 and/or the QA servers. The results of the computation, including the speed of computation, can be provided to the STB 106 for selecting the cluster of content servers to deliver the media content. The particular computation tasked can vary and can be indicative of the content servers performance with respect to more relevant tasks required during delivery of media content.

In step 608, the QA servers can provide the server metrics to the STB 106. In step 610, the STB 106 can determine whether it has obtained sufficient server metrics for the clusters of content servers to determine which cluster to utilize for delivery of the media content. In one embodiment, the STB 106 can poll the QA servers for specific server metrics. For example, the QA server for each cluster can periodically compile and store a number of server metrics for each of the content servers of the cluster, and then provide only those server metrics requested by the STB 106.

If sufficient server metrics have not been obtained by the STB 106 then additional server metrics can be requested from the QA servers. If on the other hand, the desired server metrics have been obtained then in step 612 the STB 106 can select the cluster of content servers that are to deliver the requested media content. The STB 106 can utilize the real time or near real time data, as opposed to historical data, for determining the path for the delivery of the media content. The particular address and/or location of the selected cluster of content servers can be utilized by the STB 106 for retrieving the media content. In one embodiment, signal transmission time can be utilized in selecting the cluster of content servers to deliver the media content. The selection of the cluster of content servers for delivering the media content can be based on the lowest network latency measured between the STB 106 and the cluster of content servers. The measurement can be based on the time from sending the polling request from the STB 106 until receipt of the server metrics by the STB.

From the foregoing descriptions, it would be evident to an artisan with ordinary skill in the art that the aforementioned embodiments can be modified, reduced, or enhanced without departing from the scope and spirit of the claims described below. For example, other configurations of the QA servers with the clusters of the content servers can be utilized. In one embodiment, the use of the QA server and any software resident on the QA server and/or corresponding content servers can be triggered only by new STB service requests for a connection, although other triggering events are also contemplated. In another embodiment, selection of the content servers for delivery of the media content can be done based on portions of available content servers of a plurality of content servers.

In one embodiment, the content delivery system 500 can be used with other configurations and/or systems that involve client/server relationships, such as where there are multiple redundant servers. In another embodiment, the QA client functionality can be implemented in other ways, such as embedded within the network element or server, or deployed on a separate network element or server within the same network segment. In one embodiment, the STB 106 and/or the QA servers can use various other techniques and methodologies for monitoring and determining network quality, including the content servers and the path between the content servers and the STB.

These are but a few examples of the modifications that can be applied to the present disclosure without departing from the scope of the claims. Accordingly, the reader is directed to the claims for a fuller understanding of the breadth and scope of the present disclosure.

Figure 7:
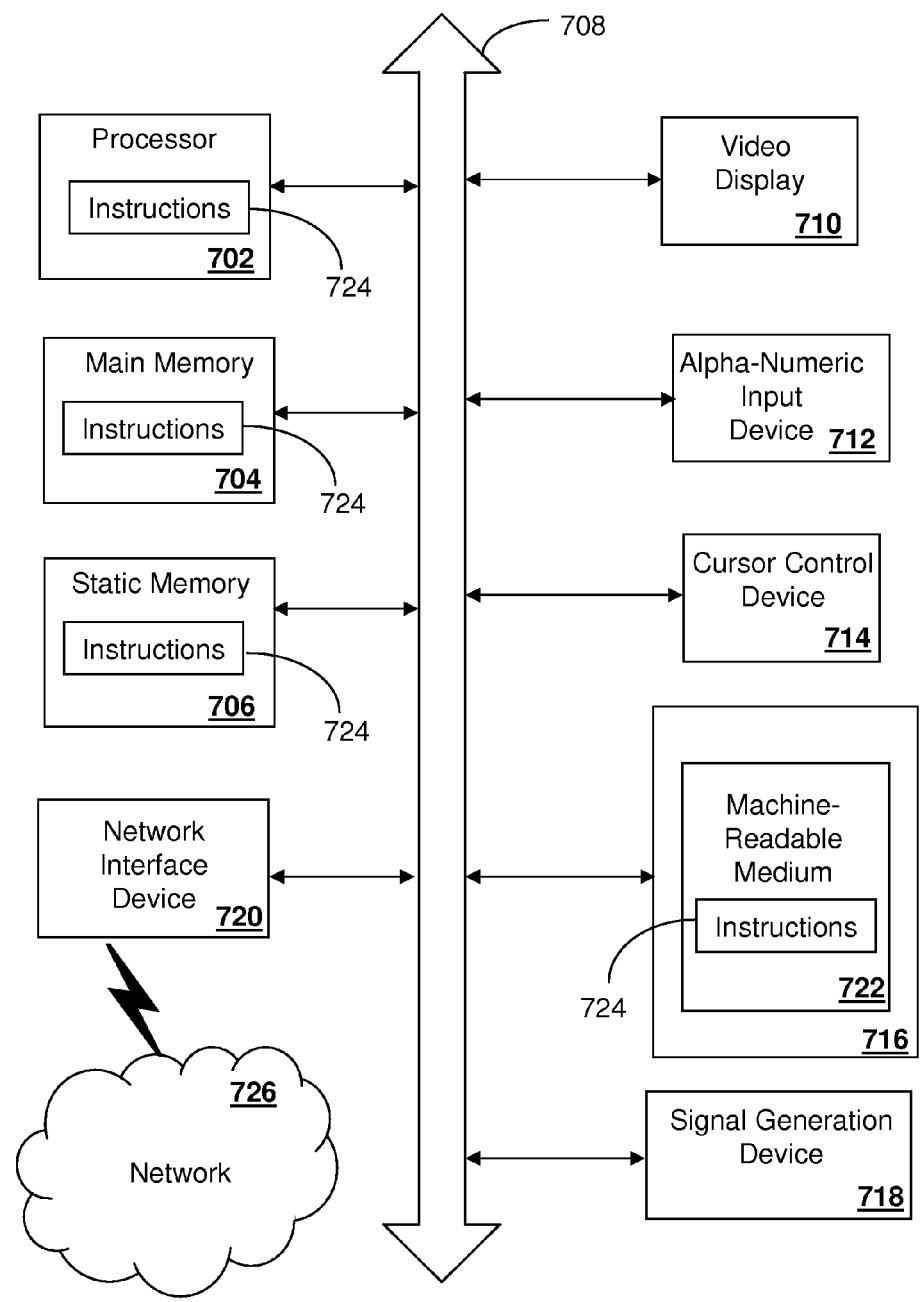
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in a set top box, comprising computer instructions which when executed by the set top box cause the set top box to perform operations comprising:
   requesting media service at the set top box from a video headend office having a plurality of clusters of content servers;
   polling one or more quality assurance servers for server metrics associated with each of the plurality of clusters, the one or more quality assurance servers compiling the server metrics for each of the content servers of the plurality of clusters, wherein the one or more quality assurance servers periodically request a group of server metrics from each of the content servers and store the group of server metrics;
   receiving the server metrics from a selection of the group of server metrics stored by the one or more quality assurance servers, wherein the server metrics comprise a speed of performing a computation by the plurality of clusters of content servers, and wherein the computation is unrelated to providing the media service to the set top box;
   selecting a cluster of content servers for delivery of the media service based at least in part on the server metrics, the selection being performed by the set top box; and
   transmitting instructions from the set top box to the one or more quality assurance servers to adjust a time period of the periodic requests for the group of server metrics.

2. The storage medium of claim 1, comprising computer instructions for receiving the media service from the selected cluster of content servers.

3. The storage medium of claim 1, comprising computer instructions for determining signal transmission time and selecting the cluster of content servers based in part on the signal transmission time.

4. The storage medium of claim 3, wherein the signal transmission time is measured between the set top box and the selected cluster of content servers.

5. The storage medium of claim 1, wherein the set top box periodically polls the one or more quality assurance servers for the server metrics.

6. The storage medium of claim 1, wherein the one or more quality assurance servers are a plurality of servers that are each coupled with a corresponding one of the plurality of clusters of content servers.

7. The storage medium of claim 1, wherein the server metrics comprise at least one of CPU usage and available memory.

8. The storage medium of claim 1, wherein the computation is designated by the set top box.

9. A set top box comprising:
   a memory storing computer instructions; and
   a controller circuit coupled to the memory, wherein the controller circuit when executing the computer instructions performs operations comprising:
      requesting media service at the set top box from a video headend office having a plurality of clusters of content servers;
      polling one or more quality assurance servers for server metrics associated with each of the plurality of clusters, the one or more quality assurance servers compiling the server metrics for each of the content servers of the plurality of clusters, wherein the one or more quality assurance servers periodically request a group of server metrics from each of the content servers and store the group of server metrics;
      receiving the server metrics from a selection of the group of server metrics stored by the one or more quality assurance servers, wherein the server metrics comprise a speed of performing a computation by the plurality of clusters of content servers, and wherein the computation is unrelated to providing the media service to the set top box;
      selecting a cluster of content servers for delivery of the media service based at least in part on the server metrics, the selection being performed by the set top box; and
   transmitting instructions from the set top box to the one or more quality assurance servers to adjust a time period of the periodic requests for the group of server metrics.

10. The set top box of claim 9, wherein the adjustment to the time period is based in part on network traffic.

11. The set top box of claim 9, wherein the controller circuit is programmed to receive the media service from the selected cluster of content servers.

12. The set top box of claim 9, wherein the controller circuit is programmed to determine signal transmission time and select the cluster of content servers based in part on the signal transmission time.

13. The set top box of claim 9, wherein the signal transmission time is measured between the set top box and the cluster of content servers.

14. The set top box of claim 10, wherein the controller circuit is programmed to periodically poll the one or more quality assurance servers for the server metrics.

15. The set top box of claim 10, wherein the one or more quality assurance servers are a plurality of servers that are each coupled with a corresponding one of the clusters of content servers.

16. The set top box of claim 10, wherein the server metrics comprise CPU usage.

17. The set top box of claim 10, wherein the server metrics comprise available memory.

18. A server comprising:
a memory storing computer instructions; and
a controller circuit coupled to the memory, wherein the controller circuit when executing the computer instructions performs operations comprising:
receiving a request for media service from a set top box, wherein the server is in communication with a video headend office having a plurality of clusters of content servers;
receiving from the set top box, polling for server metrics associated with each of the plurality of clusters;
periodically requesting a group of server metrics from each of the content servers and storing the group of server metrics;
compiling the group of server metrics for each of the content servers of the plurality of clusters;
providing to the set top box the requested server metrics from a selection of the stored group of server metrics, wherein the requested server metrics comprise a speed of performing a computation by the plurality of clusters of content servers, and wherein the computation is unrelated to providing the media service to the set top box, wherein a cluster of content servers is selected by the set top box for delivery of the media service based at least in part on the requested server metrics; and
receiving instructions from the set top box to adjust a time period of the periodic requests for the group of server metrics.

19. The server of claim 18, wherein the controller circuit is programmed to:
poll each of the content servers for data associated with other server metrics;
store the other service metrics; and
provide a portion of the other service metrics to the set top box in response to a request for the other service metrics from the set top box.

20. A server comprising:
a memory storing computer instructions; and
a controller circuit coupled with the memory, wherein the controller circuit when executing the computer instructions performs operations comprising:
processing media content for delivery to set top boxes, wherein the server is a content server included with a plurality of clusters of content servers of a video headend office;
receiving periodic requests from a quality assurance server for a group of server metrics, wherein the periodic requests are responsive to a request for media service from a set top box that is received by the quality assurance server and responsive to polling for server metrics from the set top box that is received by the quality assurance server, wherein the requested server metrics are associated with each of the plurality of clusters, wherein the requested server metrics comprise a speed of performing a computation by the plurality of clusters of content servers, and wherein the computation is unrelated to providing the media service to the set top box;
providing the group of server metrics to the quality assurance server for storage and compiling by the quality assurance server with other groups of server metrics provided to the quality assurance server by other content servers of the plurality of clusters of content servers, wherein the quality assurance server provides to the set top box requested server metrics from a selection of the stored group of server metrics, wherein the requested server metrics comprise the speed of performing the computation by the controller circuit, wherein a cluster of content servers is selected by the set top box for delivery of the media service based at least in part on the requested server metrics, and wherein instructions from the set top box are received by the quality assurance server to adjust a time period of the periodic requests for the group of server metrics.

21. A method, comprising:
requesting media service at a set top box from a video headend office having a plurality of clusters of content servers;
utilizing the set top box for polling one or more quality assurance servers for server metrics associated with each of the plurality of clusters, the one or more quality assurance servers compiling the server metrics for each of the content servers of the plurality of clusters, wherein the one or more quality assurance servers periodically request a group of server metrics from each of the content servers and store the group of server metrics;
receiving at the set top box, the server metrics from a selection of the group of server metrics stored by the one or more quality assurance servers, wherein the server metrics comprise a speed of performing a computation by the plurality of clusters of content servers, and wherein the computation is unrelated to providing the media service to the set top box;
selecting a cluster of content servers for delivery of the media service based at least in part on the server metrics, the selection being performed by the set top box; and
transmitting instructions from the set top box to the one or more quality assurance servers to adjust a time period of the periodic requests for the group of server metrics.

22. The method of claim 21, wherein the selection of the cluster of content servers is based in part on a signal transmission time measured between the set top box and the selected cluster of content servers, wherein the computation is designated by the set top box and is unrelated to providing media service to the set top box.

* * * * *